Figure 1:
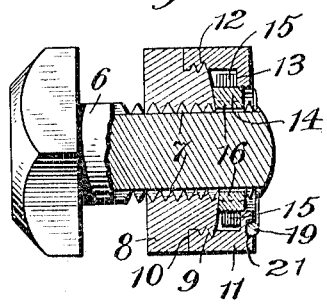

E. J. FILLINGIM.
NUT LOCK.
APPLICATION FILED FEB. 15, 1913.

1,081,820.

Patented Dec. 16, 1913.

Witnesses:
Jas. E. Hutchinson
Charles J. Kappler

Inventor:
Elijah J. Fillingim,
By H. Ralph Burton, Attorney

UNITED STATES PATENT OFFICE.

ELIJAH J. FILLINGIM, OF PACE, FLORIDA.

NUT-LOCK.

1,081,820.

Specification of Letters Patent.

Patented Dec. 16, 1913.

Application filed February 15, 1913. Serial No. 748,560.

*To all whom it may concern:*

Be it known that I, ELIJAH J. FILLINGIM, a citizen of the United States, residing at Pace, in the county of Santa Rosa and State of Florida, have invented certain new and useful Improvements in Nut-Locks, of which the following is a specification.

It is an object of this invention to provide means for preventing a nut from turning off a bolt or the like that will lock at any desired position on the screw-threaded portion of the bolt, and it also is an object to so position the locking means that a portion thereof is readily accessible to manipulation to permit the nut to be turned off the bolt when desired.

When read in connection with the description herein, the details of construction and arrangement of parts contemplated by the invention will be apparent from the accompanying drawing, forming part hereof, and wherein an embodiment of the invention is disclosed, for purposes of illustration.

While the device shown herein now is considered to represent the best embodiment of the invention, it is to be understood that it merely is illustrative of the principles thereof, that the parts can be organized variously within the limits prescribed by the claims without departing in the least from the nature and spirit of the invention.

Like reference-characters refer to corresponding parts in the views of the drawing, of which—

Figure 2:
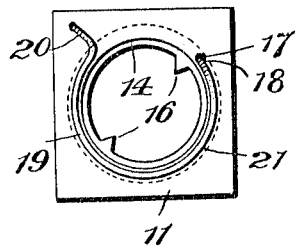
Figure 3:
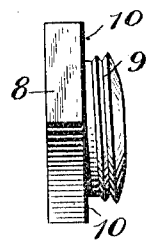
Figure 4:
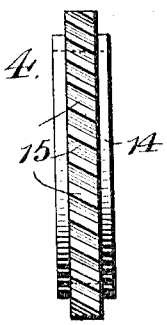
Figure 5:
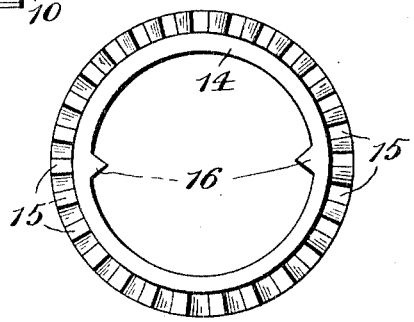
Figure 6:
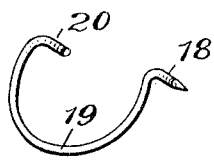

Figure 1 is a longitudinal sectional view; Fig. 2 is a view of the outer or locking member of the nut; Fig. 3 is a view of the inner member of the nut; Fig. 4 is an edge view of the toothed ratchet washer; Fig. 5 is a plan view of the toothed ratchet-washer; and Fig. 6 is a view of the pawl member or locking-spring.

Having more particular reference to the drawings, 6 designates a bolt, which is formed with longitudinally-disposed grooves 7 in its screw-threaded portion. To coöperate with the bolt there is provided a nut that comprises two superposed members. The inner member, 8, of the nut is interiorly screw threaded to engage the threads of the bolt, and on its outer side, that is on the side toward the free end of the bolt, it is formed with a reduced exteriorly screw-threaded portion 9 and a plane surface 10. The outer member, 11, of the nut has its bore formed for a portion of its length with screw-threads, as indicated by 12, adapted to engage the threads of the portion 9 of the member 8 and near its outer surface or head with an annular shoulder 13. A washer 14 is arranged to fit loosely over the screw-threaded portion of the bolt, and it is formed on its exterior periphery with teeth 15 disposed at an angle to the axial line of the bolt and on its interior periphery with lugs 16 projecting into the grooves 7 of the bolt. The washer is arranged to contact on one side with the shoulder 13 and on the other side with the end of portion 9, whereby it is held in place. A perforation or hole 17 extends from the outside of member 11 through the shoulder 13 to the teeth of the washer, and through this hole projects a downturned free end 18 of a pawl member or locking-spring 19 located on the outer face of member 11. The pawl is secured to the member by having its other end 20 downturned into the member, and it is approximately circular in shape, so that it will lie in a circular seat 21 therefor in the head of the member. The downturned end 18 of the pawl is of sufficient length to project between the teeth 15 of the washer.

In use the member 8 is turned a sufficient distance on a bolt for a part of the screw-threaded portion of the bolt to project beyond the exteriorly screw-threaded portion 9, and then the member 11, within which is the washer 14, is turned over the end of the bolt with the lugs 16 projecting into the grooves 7 and then turned onto the portion 9 of member 8 until its under or inner surface contacts with the plane surface 10. The engagement of the end of the pawl member between the teeth of the washer is sufficient to retain the washer in place in the member 11 until placed on the bolt. Then the two members of the nut are turned together on the bolt to the position desired. The exterior threads of the member 8 and the interior threads of the member 11 are so relatively formed that, when the two opposing surfaces of the members are in contact, the lateral faces of the members that are gripped by a turning tool are coincident. The lugs 16 of the washer in engagement with the grooves 7 of the bolt prevent turning of the washer as the nut is turned. The teeth of the washer are inclined in such a direction that, as the nut is turned on a bolt, the end 18 of the pawl will be moved out of position between teeth and relative movement of the nut and washer permitted, and that, on tendency of the nut to move off the bolt, there is no such disengagement of the pawl from the teeth. Thus it will be seen that this ratchet arrangement permits the nut to be turned on a bolt, but that the projection of the end of the pawl between teeth of the ratchet-washer prevents turning in the opposite direction. Of course, the outer member of the nut being locked as described, the inner member, which is in engagement with the threads of the bolt, also is locked. When it is desired to remove a nut so locked, the end of a proper tool is inserted under the spring locking member near its tooth-engaging end and that end lifted from engagement with the washer, whereupon the nut is free to turn off.

Having thus described my invention, what I claim as new, and desire to secure by Letters Patent, is:—

1. The combination of a bolt having a screw-threaded portion and a longitudinal groove in the screw-threaded portion, and a nut comprising an inner member having interior threads in engagement with the threads of the bolt and an exteriorly threaded portion, an outer member having a bore formed with threads arranged to engage the exterior threads of said inner member and with an annular shoulder, a washer seated between the end of said exteriorly threaded portion and said shoulder and formed with peripheral teeth disposed at an angle to the axial line of the bolt and with a lug projecting into said longitudinal groove, and a pawl member in engagement with teeth of said washer.

2. A nut having a screw-threaded bore and in the bore an annular shoulder, in the bore and seated against said shoulder a washer having peripheral teeth disposed at an angle to the axial line and means to prevent rotative movement with respect to a bolt, there being a hole extending from the head of the nut through the shoulder to said teeth, and on the nut a spring member having a downturned end disposed in said hole and in engagement with teeth of said washer.

In testimony whereof I affix my signature in presence of two witnesses.

ELIJAH J. FILLINGIM.

Witnesses:
OTIS CHAPMAN,
H. H. FLEMING.

---

Copies of this patent may be obtained for five cents each, by addressing the "Commissioner of Patents, Washington, D. C."